United States Patent
Yang

(10) Patent No.: US 11,251,504 B2
(45) Date of Patent: Feb. 15, 2022

(54) CAP ASSEMBLY AND SECONDARY BATTERY

(71) Applicant: Contemporary Amperex Technology Co., Limited, Ningde (CN)

(72) Inventor: Jianxiong Yang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 76 days.

(21) Appl. No.: 16/544,536

(22) Filed: Aug. 19, 2019

(65) Prior Publication Data
US 2020/0350550 A1 Nov. 5, 2020

(30) Foreign Application Priority Data

Apr. 30, 2019 (CN) .......................... 201920622424.X

(51) Int. Cl.
*H01M 50/54* (2021.01)
*H01M 50/172* (2021.01)
(Continued)

(52) U.S. Cl.
CPC ......... *H01M 50/54* (2021.01); *H01M 50/172* (2021.01); *H01M 50/183* (2021.01); *H01M 50/543* (2021.01)

(58) Field of Classification Search
CPC .. H01M 50/54; H01M 50/174; H01M 50/184; H01M 50/59; H01M 50/543;
(Continued)

(56) References Cited

U.S. PATENT DOCUMENTS

| 2005/0164079 A1* | 7/2005 | Kim ...................... H01M 2/361 429/174 |
| 2012/0156548 A1* | 6/2012 | Kim .................... H01M 2/0237 429/158 |

(Continued)

FOREIGN PATENT DOCUMENTS

| CN | 205657096 U | 10/2016 |
| CN | 206947392 U | 1/2018 |

(Continued)

OTHER PUBLICATIONS

Machine Translation of CN-207233790-U (Year: 2018).*
(Continued)

*Primary Examiner* — Maria Laios
*Assistant Examiner* — Grace Ann Kenlaw
(74) *Attorney, Agent, or Firm* — Law Offices of Liaoteng Wang

(57) ABSTRACT

The disclosure relates to a cap assembly and a secondary battery. The cap assembly comprises: a cap plate comprising an electrode lead-out hole; an electrode terminal disposed at a side of the cap plate and covering the electrode lead-out hole; a fixing component, wherein the fixing component and the electrode terminal are disposed at the same side of the cap plate, the electrode terminal is connected to the cap plate through the fixing component, and the fixing component comprises a protrusion extending between the electrode terminal and the cap plate; and a sealing ring, wherein the cap plate is connected to the electrode terminal through the sealing ring, and in an axial direction of the electrode lead-out hole, a projection of the sealing ring at least partially overlaps with a projection of the protrusion.

20 Claims, 6 Drawing Sheets

(51) Int. Cl.
*H01M 50/183* (2021.01)
*H01M 50/543* (2021.01)

(58) Field of Classification Search
CPC .... H01M 50/552; H01M 50/147; H01M 2/08; H01M 2/021; H01M 2/30; H01M 2/04
See application file for complete search history.

(56) References Cited

U.S. PATENT DOCUMENTS

| | | | |
|---|---|---|---|
| 2015/0155532 A1* | 6/2015 | Harayama | H01M 2/22 429/179 |
| 2019/0067651 A1 | 2/2019 | Li et al. | |
| 2019/0109305 A1 | 4/2019 | Zheng et al. | |

FOREIGN PATENT DOCUMENTS

| | | | |
|---|---|---|---|
| CN | 207233789 U | | 4/2018 |
| CN | 207233790 U | * | 4/2018 |
| CN | 108365138 A | | 8/2018 |
| CN | 108767143 A | | 11/2018 |
| CN | 208336334 U | | 1/2019 |
| CN | 208690318 U | | 4/2019 |
| CN | 209747633 U | | 12/2019 |
| CN | 209804723 U | | 12/2019 |
| JP | 2013161692 A | | 8/2013 |

OTHER PUBLICATIONS

The extended European search report dated Feb. 27, 2020 for European application No. 19193450.4, 6 pages.
PCT International Search Report for PCT/CN2020/080641, dated Jun. 30, 2020, 11 pages.
The First Office Action for Japanese Application No. 2020-558599, dated Nov. 19, 2021, 8 pages.

* cited by examiner

CAP ASSEMBLY AND SECONDARY BATTERY

CROSS-REFERENCE TO RELATED APPLICATION

This application is based on and claims priority to Chinese Patent Application No. 201920622424.X filed on Apr. 30, 2019, which is incorporated herein by reference in its entirety.

FIELD

The disclosure relates to the technical field of battery, and in particular to a cap assembly and a secondary battery.

BACKGROUND

Lithium ion secondary batteries have been widely used in the fields of hybrid vehicles and electric vehicles. This is because it has high energy, high capacity and high power. The secondary battery includes a cap plate and an electrode terminal disposed on the cap plate. However, there is a gap between the cap plate and the electrode terminal in the prior art, so that there is a risk that metal debris enters the gap between the cap plate and the electrode terminal, causing a short circuit between the cap plate and the electrode terminal and affecting its safety in use.

SUMMARY

According to embodiments of the disclosure, there is provided a cap assembly and a secondary battery. The cap assembly can prevent the metal debris from connecting both the electrode terminal and the cap plate, reduce the possibility that a short circuit between the cap plate and the electrode terminal occurs due to the metal debris, and improve the safety of the cap assembly in use.

In one aspect, embodiments of the disclosure provide a cap assembly for a secondary battery, including: a cap plate including an electrode lead-out hole; an electrode terminal disposed at a side of the cap plate and covering the electrode lead-out hole; a fixing component, wherein the fixing component and the electrode terminal are disposed at the same side of the cap plate, the electrode terminal is connected to the cap plate through the fixing component, and the fixing component includes a protrusion extending between the electrode terminal and the cap plate; and a sealing ring, wherein the cap plate is connected to the electrode terminal through the sealing ring, and in an axial direction of the electrode lead-out hole, a projection of the sealing ring at least partially overlaps with a projection of the protrusion.

According to an aspect of embodiments of the disclosure, in the axial direction, a portion of the sealing ring that overlaps with the protrusion is in contact with the protrusion, and the portion of the sealing ring that overlaps with the protrusion is in contact with the cap plate.

According to an aspect of embodiments of the disclosure, an annular cavity is formed between the protrusion and the cap plate, wherein the annular cavity has an opening facing an axis of the electrode lead-out hole, and the sealing ring is at least partially disposed in the annular cavity.

According to an aspect of embodiments of the disclosure, the sealing ring includes a first segment and a second segment that are successively distributed along the axial direction, wherein in a radial direction of the electrode lead-out hole, a maximum outer diameter of the first segment is smaller than a minimum outer diameter of the second segment, and the maximum outer diameter of the first segment is smaller than a minimum outer diameter of the electrode terminal.

According to an aspect of embodiments of the disclosure, the sealing ring includes a first segment and a second segment that are successively distributed along the axial direction, wherein the electrode terminal includes a recess at its periphery, and the fixing component includes a bump disposed corresponding to the recess, and wherein in a radial direction of the electrode lead-out hole, a maximum outer diameter of the first segment is smaller than a minimum outer diameter of the second segment, and the maximum outer diameter of the first segment is larger than a minimum outer diameter of the electrode terminal and is smaller than a maximum outer diameter of the electrode terminal.

According to an aspect of embodiments of the disclosure, there is a gap between a periphery of the first segment and the fixing component and/or there is a gap between a periphery of the second segment and the fixing component.

According to an aspect of embodiments of the disclosure, in the radial direction of the electrode lead-out hole, the second segment extends beyond the first segment by a dimension D1, and a maximum dimension of the first segment is D2, wherein a ratio of D1/D2 is 0.01~0.1.

According to an aspect of embodiments of the disclosure, in the axial direction of the electrode lead-out hole, a height of the second segment is H1, and a total height of the first segment and the second segment is H2, wherein a ratio of H1/H2 is 0.35~0.65.

According to an aspect of embodiments of the disclosure, a portion of the second segment extending beyond the first segment is disposed between the protrusion and the cap plate and has an amount of compression A in the axial direction; and the first segment and the second segment of the sealing ring have an overlapped portion in the axial direction, and the overlapped portion is disposed between the electrode terminal and the cap plate and has an amount of compression B in the axial direction, wherein A is smaller than B.

According to an aspect of embodiments of the disclosure, in the radial direction of the electrode lead-out hole, the minimum outer diameter of the second segment is larger than the maximum outer diameter of the electrode terminal.

According to an aspect of embodiments of the disclosure, an angle between an outline of a periphery of the first segment in a longitudinal sectional view and an outline of a surface of the second segment facing the protrusion in the longitudinal sectional view has a range of 90° to 120°.

According to an aspect of embodiments of the disclosure, the cap assembly further includes a lower insulator which includes a body portion and a first extending portion, wherein the body portion and the fixing component are respectively disposed at opposite sides of the cap plate, and the first extending portion extends at least partially into the electrode lead-out hole; the sealing ring includes a second extending portion which at least partially extends into the electrode lead-out hole; and in the axial direction, a height of the second extending portion is larger than a height of the first extending portion.

According to an aspect of embodiments of the disclosure, the cap plate has a thickness of 0.01 cm to 10 cm in the axial direction, and/or the electrode terminal has a thickness of 0.01 cm to 10 cm in the axial direction.

In another aspect, embodiments of the disclosure provide a secondary battery including: a case including an opening; an electrode assembly disposed in the case, wherein the electrode assembly includes a body and a tab extending from the body; and the above cap assembly for sealing the opening, wherein the tab is electrically connected to the electrode terminal.

BRIEF DESCRIPTION OF THE DRAWINGS

Features, advantages, and technical effects of exemplary embodiments of the disclosure will be described below with reference to accompanying drawings.

Figure 1:
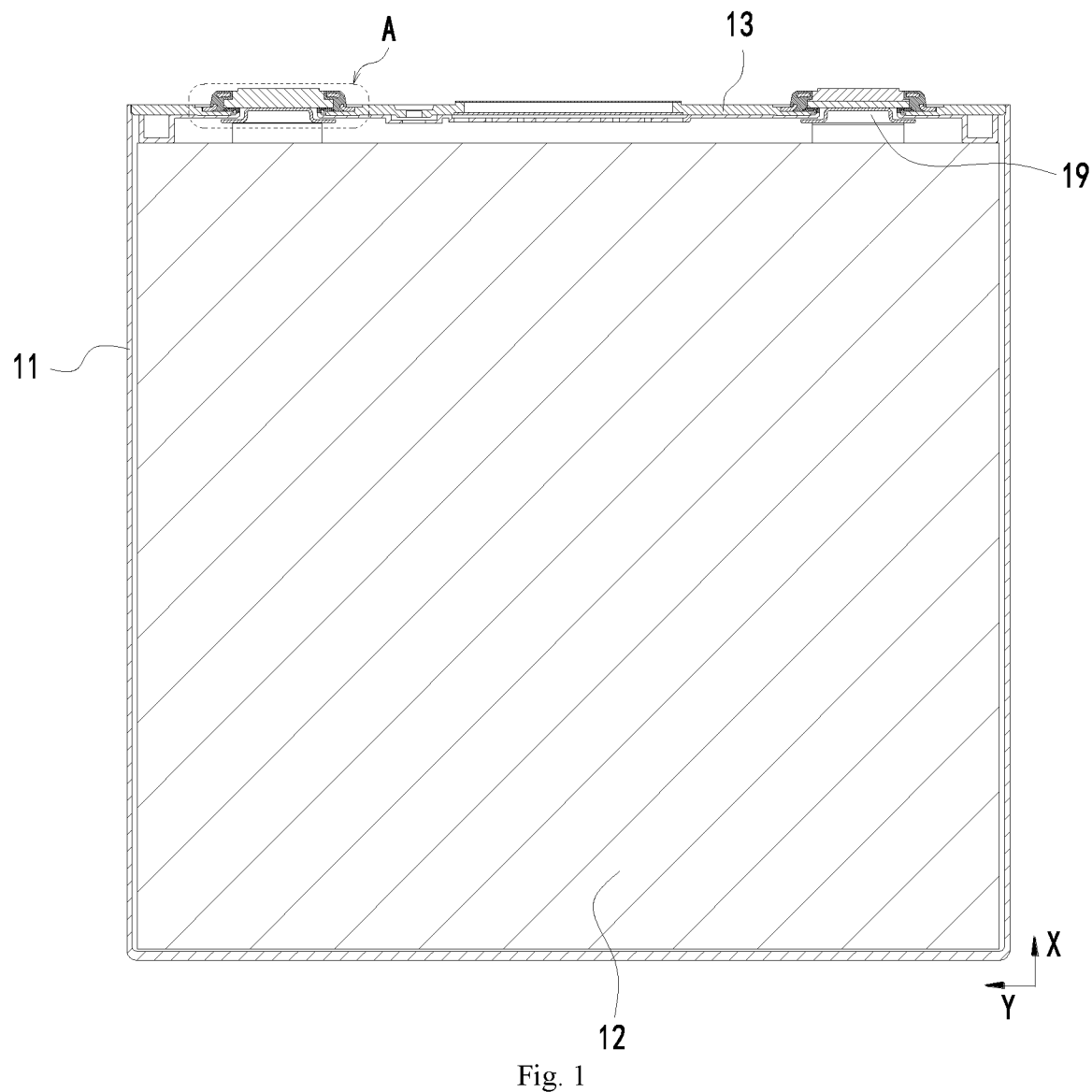
FIG. 1 is a structural schematic diagram of a secondary battery according to an embodiment of the disclosure.

The views are not necessarily plotted in actual proportion in the drawings.

REFERENCE SIGNS IN THE DRAWINGS 10 secondary battery;
11 case;
12 electrode assembly;
13 cap assembly;
14 cap plate;
141 electrode lead-out hole;
142 annular bulge;
15 electrode terminal;
151 recess;
151a bottom end;
16 fixing component;
16a metal support;
16b insulator;
161 protrusion;
162 bump;
17 sealing ring;
171 first segment;
172 second segment;
173 second extending portion;
174 annular groove;
18 lower insulator;
181 first extending portion;
19 collector;
98 annular cavity;
99 gap;
100 overlapped portion
X axial direction;
Y radial direction.

DETAILED DESCRIPTION

Below, embodiments of the disclosure will be further described in detail with reference to the drawings and embodiments. The detailed description according to the embodiments and the accompanying drawings are intended to exemplary illustrate the principles of the disclosure and are not intended to limit the scope of the disclosure. That is, the disclosure is not limited to the described embodiments.

In the description of the disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the disclosure and simplifying the description, and is not intended to indicate or imply that the device or component referred to has a particular orientation, is constructed and operated in a particular orientation, and therefore cannot be understood to be a limitation of the disclosure. Moreover, the terms "first", "second", and the like are configured for descriptive purposes only and are not to be construed as indicating or implying relative importance.

In the description of the disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the disclosure can be understood by the person skilled in the art according to actual circumstance.

For better understanding of the disclosure, embodiments of the disclosure will be described below in detail with reference to FIGS. 1 to 10.

Figure 2:
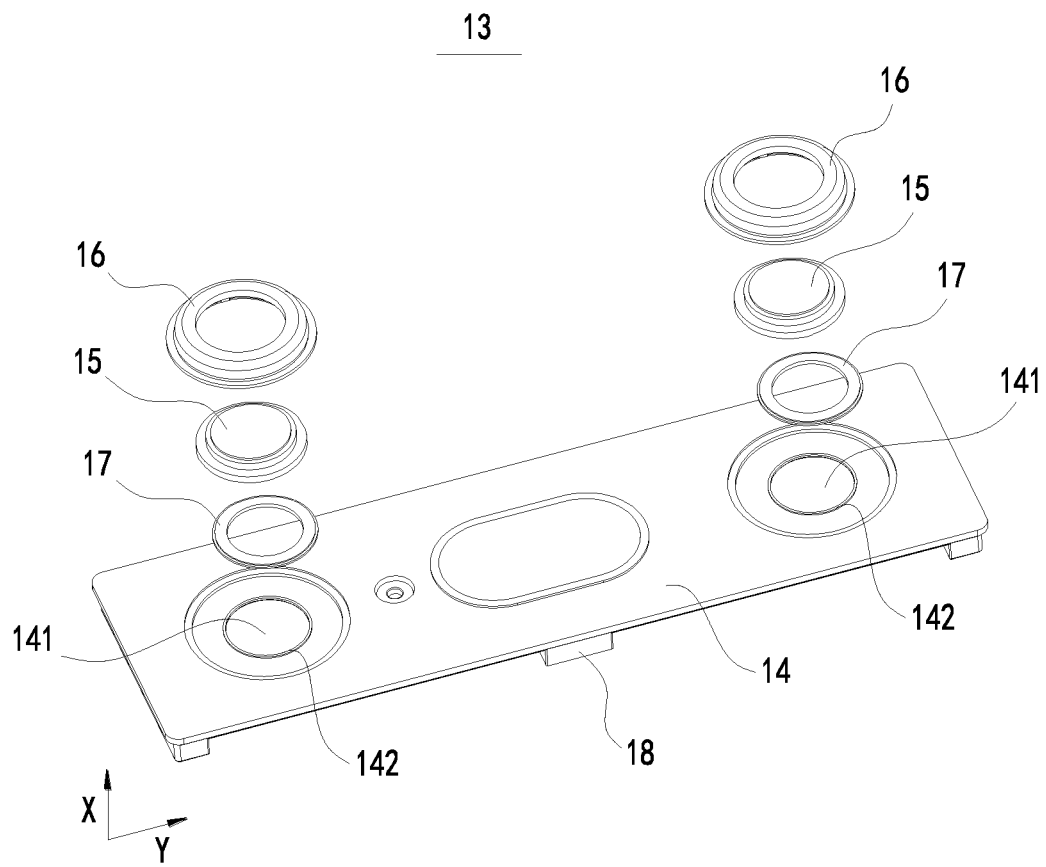
FIG. 2 is an exploded structural view of a cap assembly according to an embodiment of the disclosure.
Figure 3:
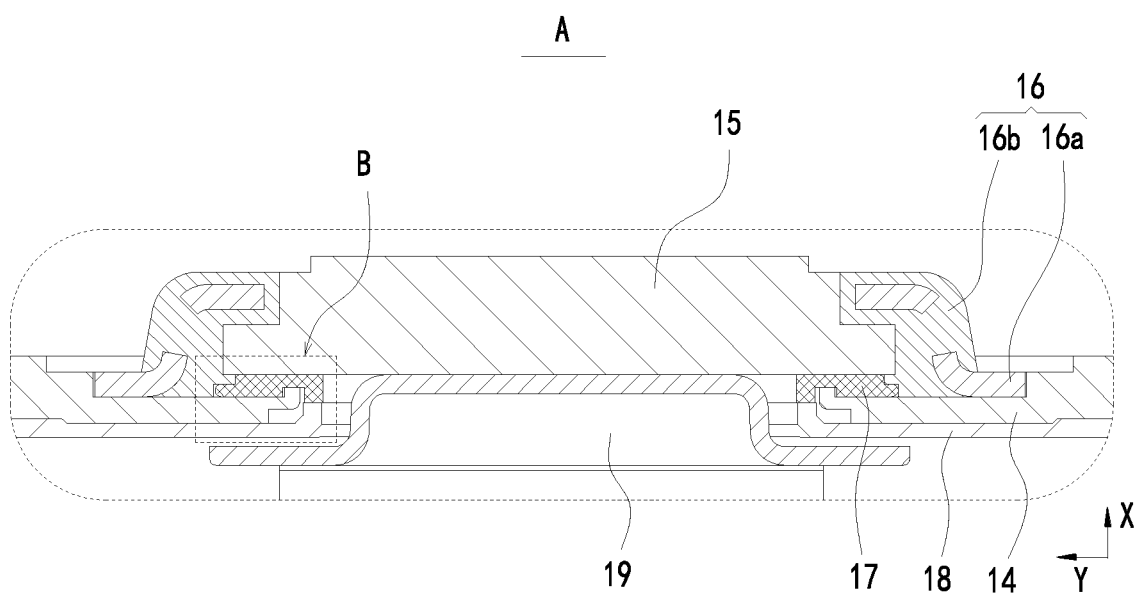
FIG. 3 is an enlarged view of a portion A in FIG. 1.
Figure 4:
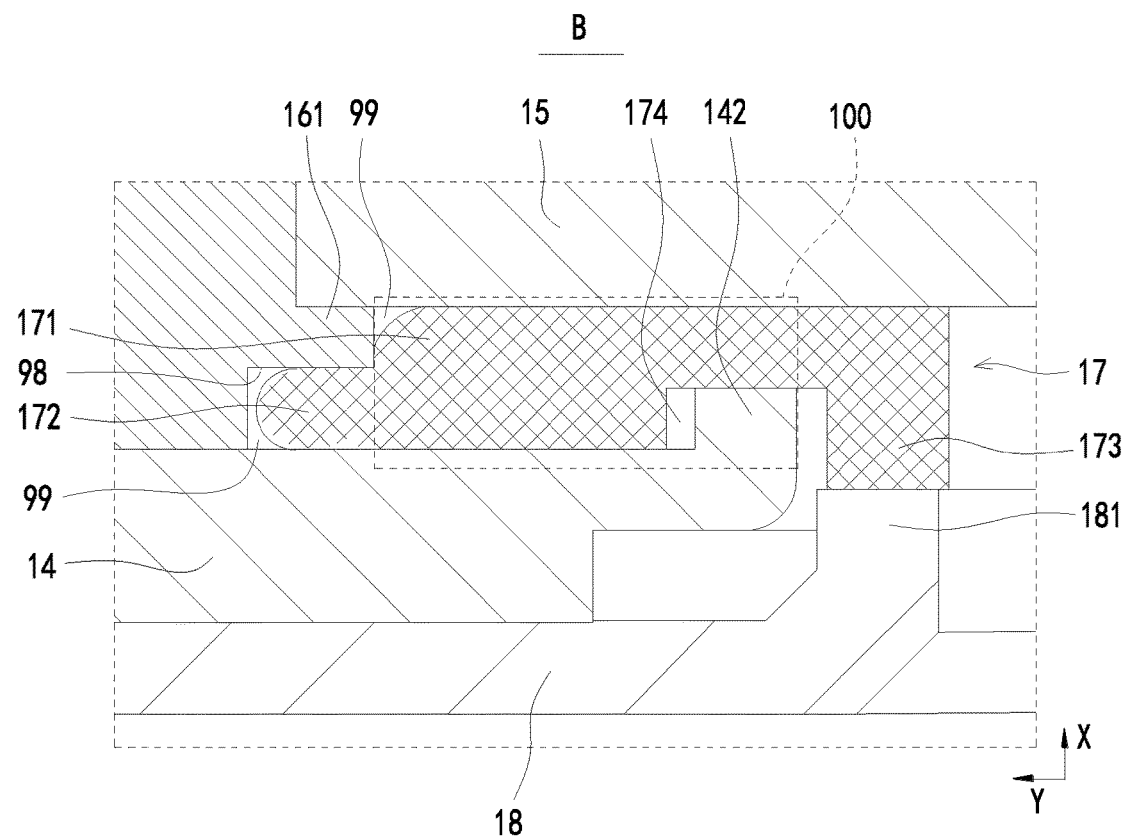
FIG. 4 is an enlarged view of a portion B in FIG. 3.

FIG. 1 schematically shows a secondary battery 10 including a cap assembly 13 according to an embodiment of the disclosure. As shown in FIG. 1, the secondary battery 10 includes a case 11, an electrode assembly 12 and a cap assembly 13. Referring to FIG. 2, the cap assembly 13 according to the embodiment of the disclosure includes a cap plate 14, an electrode terminal 15, a fixing component 16 and a sealing ring 17. The cap plate 14 has an electrode lead-out hole 141. The cap plate 14 has a predetermined thickness. The electrode lead-out hole 141 passes through the cap plate 14 in a thickness direction of the cap plate 14. The electrode terminal 15 is disposed at a side of the cap plate 14 and covers the electrode lead-out hole 141. The fixing component 16 and the electrode terminal 15 are provided on the same side of the cap plate 14. The electrode terminal 15 is connected to the cap plate 14 through the fixing component 16. Referring to FIGS. 3 and 4, the fixing component 16 includes a protrusion 161 extending between the electrode terminal 15 and the cap plate 14. The protrusion 161 restrains and limits the electrode terminal 15 in an axial direction of the electrode lead-out hole 141, which reduces the possibility that the electrode terminal 15 is poorly connected to the fixing component 16 due to external force. The cap plate 14 is connected to the electrode terminal 15 through the sealing ring 17. Along the axial direction X of the electrode lead-out hole 141, a projection of the sealing ring 17 at least partially overlaps with a projection of the protrusion 161. The sealing ring 17 is at least partially disposed between the protrusion 161 and the cap plate 14. Along a radial direction Y of the electrode lead-out hole 141, the surface of the cap plate 14 in which the electrode lead-out hole 141 is formed does not exceed an inner wall of the sealing ring 17.

The cap assembly 13 according to the embodiment of the disclosure includes a cap plate 14, an electrode terminal 15, a fixing component 16 and a sealing ring 17. The electrode terminal 15 is connected to the cap plate 14 through the fixing component 16. The fixing component 16 has a protrusion 161 for restraining and limiting the electrode terminal 15. The protrusion 161 extends below the electrode terminal 15. Since the sealing ring 17 is at least partially disposed between the protrusion 161 and the cap plate 14, it prevents the metal debris from connecting both the electrode terminal 15 and the cap plate 14. The possibility that a short circuit between the electrode terminal 15 and the cap plate 14 occurs due to metal debris is reduced, and the safety of the cap assembly 13 in use is improved. On the other hand, the sealing ring 17 can increase the creepage distance between the electrode terminal 15 and the cap plate 14, and reduce the possibility that a breakdown between the electrode terminal 15 and the cap plate 14 occurs when the secondary battery is subjected to high voltage. Furthermore, when the electrolyte leaks, the sealing ring 17 can reduce the electrolyte entering the gap between the protrusion 161 and the cap plate 14, and reduce the excessive electrolyte accumulation between the electrode terminal 15 and the cap plate 14 which then causes a reduced resistance between the electrode terminal 15 and the cap plate 14. Accordingly, it reduces the possibility that the breakdown between the electrode terminal 15 and the cap plate 14 occurs when the secondary battery is subjected to high pressure, and improves the safety of the cap assembly 13 in use.

In an embodiment, a portion of the sealing ring 17 is disposed between the electrode terminal 15 and the cap plate 14. Both the electrode terminal 15 and the cap plate 14 are directly connected to the sealing ring 17. The sealing ring 17 seals the gap between the electrode terminal 15 and the cap plate 14 such that any two of the electrode terminal 15, the cap plate 14 and the sealing ring 17 are sealed. Accordingly, the electrolyte can be further effectively blocked from entering between the electrode terminal 15 and the cap plate 14.

In an embodiment, the sealing ring 17 seals the protrusion 161 and the cap plate 14 such that any two of the protrusion 161, the cap plate 14 and the sealing ring 17 are sealed. Accordingly, the metal debris and electrolyte can be further effectively blocked from entering between the electrode terminal 15 and the cap plate 14.

In an embodiment, in the axial direction X of the electrode lead-out hole 141, a portion of the sealing ring 17 that overlaps with the protrusion 161 is in contact with the protrusion 161, and the portion of the sealing ring 17 that overlaps with the protrusion 161 is in contact with the cap plate 14. The portion of the sealing ring 17 that overlaps with the protrusion 161 has an upper surface and a lower surface which are opposed in the axial direction X, wherein the upper surface is in contact with the protrusion 161, and the lower surface is in contact with the cap plate 14. In this way, the sealing between the protrusion 161 and the cap plate 14 can be further improved. In one example, the upper surface and the protrusion 161 may be in contact with each other but apply no force on each other, i.e., the force between the upper surface and the protrusion 161 is zero. The lower surface and the cap plate 14 may be in contact with each other but apply no force on each other, i.e., the force between the protrusion 161 and the cap plate 14 is zero. In another example, the protrusion 161 is in contact with the upper surface and applies a predetermined compressive force on the upper surface, and the cap plate 14 is in contact with the lower surface and applies a predetermined compressive force on the lower surface. In this way, the sealing ring can provide a supporting force for the protrusion, and reduces the possibility that the protrusion moves downward.

In an embodiment, the cap plate 14 has a thickness of 0.01 cm to 10 cm in the axial direction, and/or the electrode terminal 15 has a thickness of 0.01 cm to 10 cm in the axial direction.

In an embodiment, an annular cavity 98 is formed between the protrusion 161 and the cap plate 14. The annular cavity 98 has an opening facing an axis of the electrode lead-out hole 141. The sealing ring 17 is at least partially disposed in the annular cavity 98. A portion of the sealing ring 17 that overlaps with the protrusion 161 is disposed below the protrusion 161. In one example, the sealing ring 17 can be entirely disposed within the annular cavity 98. In another example, a portion of the sealing ring 17 may extend into the annular cavity 98 and the other portion may be disposed outside of the annular cavity 98. A portion of the sealing ring 17 outside of the annular cavity 98 is disposed between the electrode terminal 15 and the cap plate 14.

Figure 5:
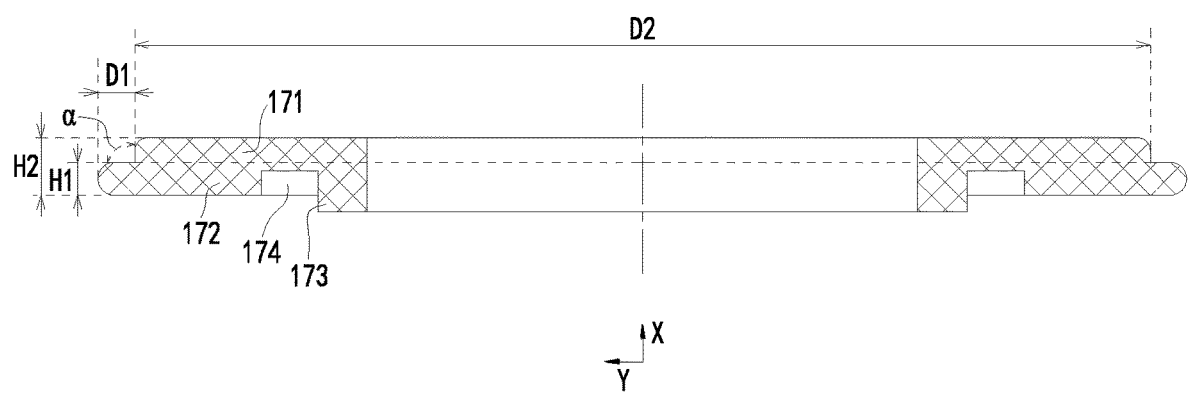
FIG. 5 is a half sectional view of a sealing ring according to an embodiment of the disclosure.

In an embodiment, referring to FIG. 5, the sealing ring 17 has a first segment 171 and a second segment 172 that are successively distributed along the axial direction X. The broken line in FIG. 5 is for illustrative purposes only and does not limit the structure. In the radial direction Y of the electrode lead-out hole 141, a maximum outer diameter of the first segment 171 is smaller than a minimum outer diameter of the second segment 172, and the maximum outer diameter of the first segment 171 is smaller than a minimum outer diameter of the electrode terminal 15. The maximum outer diameter and the minimum outer diameter described herein indicate that in the radial direction Y of the electrode lead-out hole 141, a longest straight line among all straight lines passing through the center of the sealing ring 17 or the center the electrode terminal 15 corresponds to the maximum outer diameter, while a shortest straight line corresponds to the minimum outer diameter. The first segment 171 and the second segment 172 of the sealing ring 17 form a stepped structure such that the sealing ring 17 has a stepped shape at its periphery. Thus, the creepage distance between the electrode terminal 15 and the cap plate 14 along the periphery of the sealing ring 17 is larger than a vertical distance between the electrode terminal 15 and the cap plate 14 in the axial direction X. Accordingly, the structure of the sealing ring 17 according to the embodiment can effectively extend the creepage distance between the electrode terminal 15 and the cap plate 14, and further reduce the possibility that the breakdown between the electrode terminal 15 and the cap plate 14 occurs when the secondary battery is subjected to high voltage.

Figure 6:
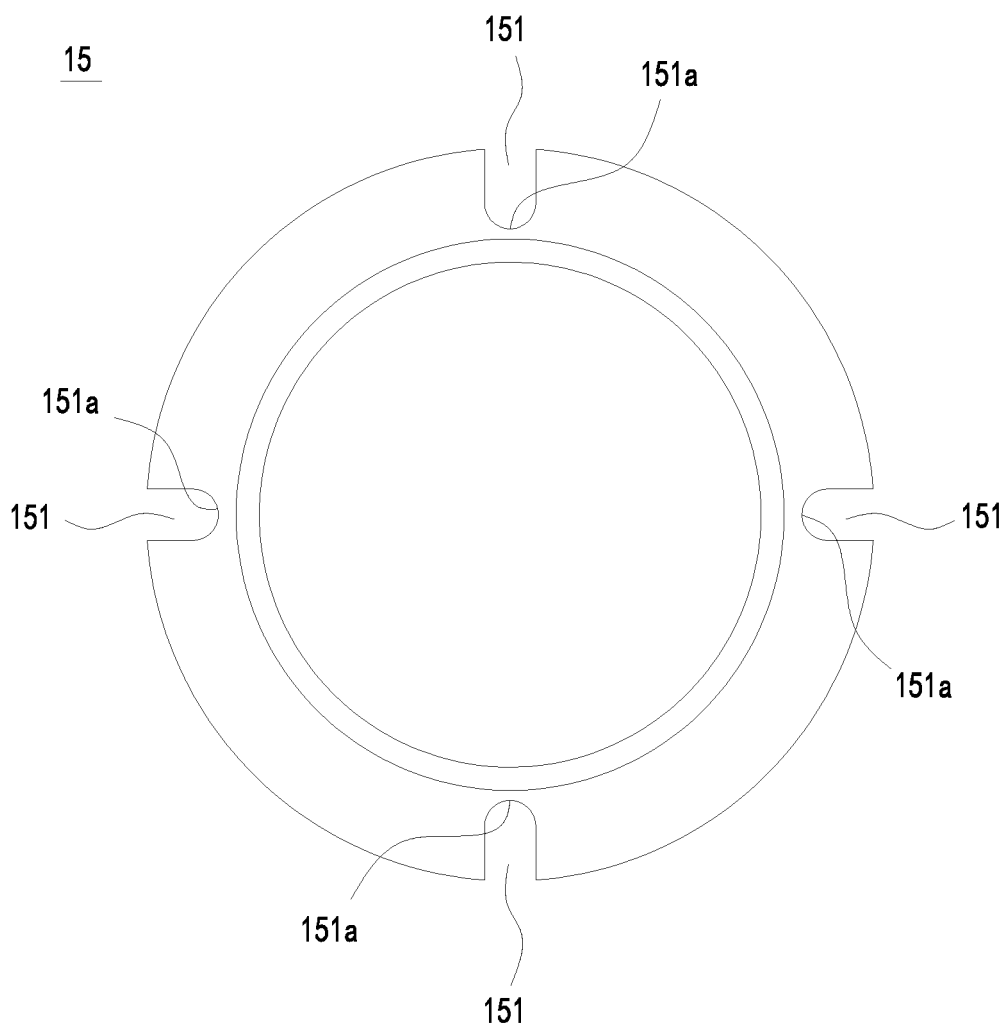
FIG. 6 is a top structural view of an electrode terminal according to an embodiment of the disclosure.
Figure 7:
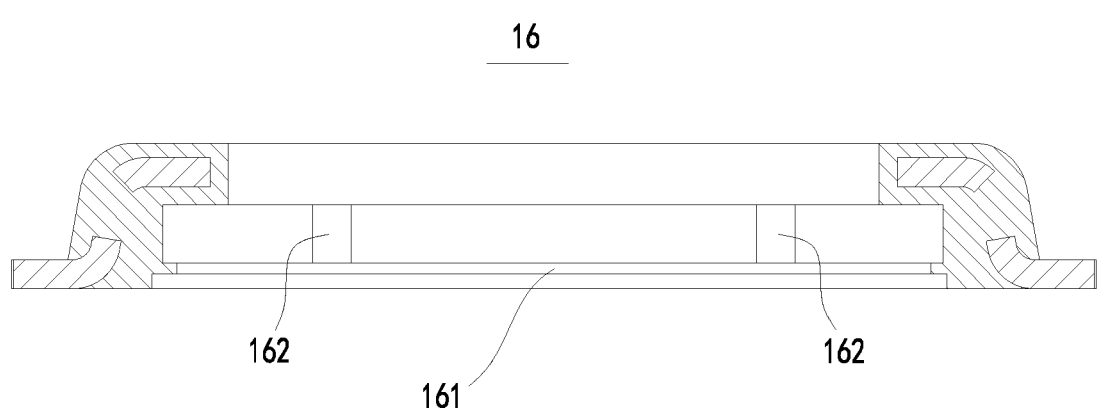
FIG. 7 is a structural section view of a fixing component according to an embodiment of the disclosure.
Figure 8:
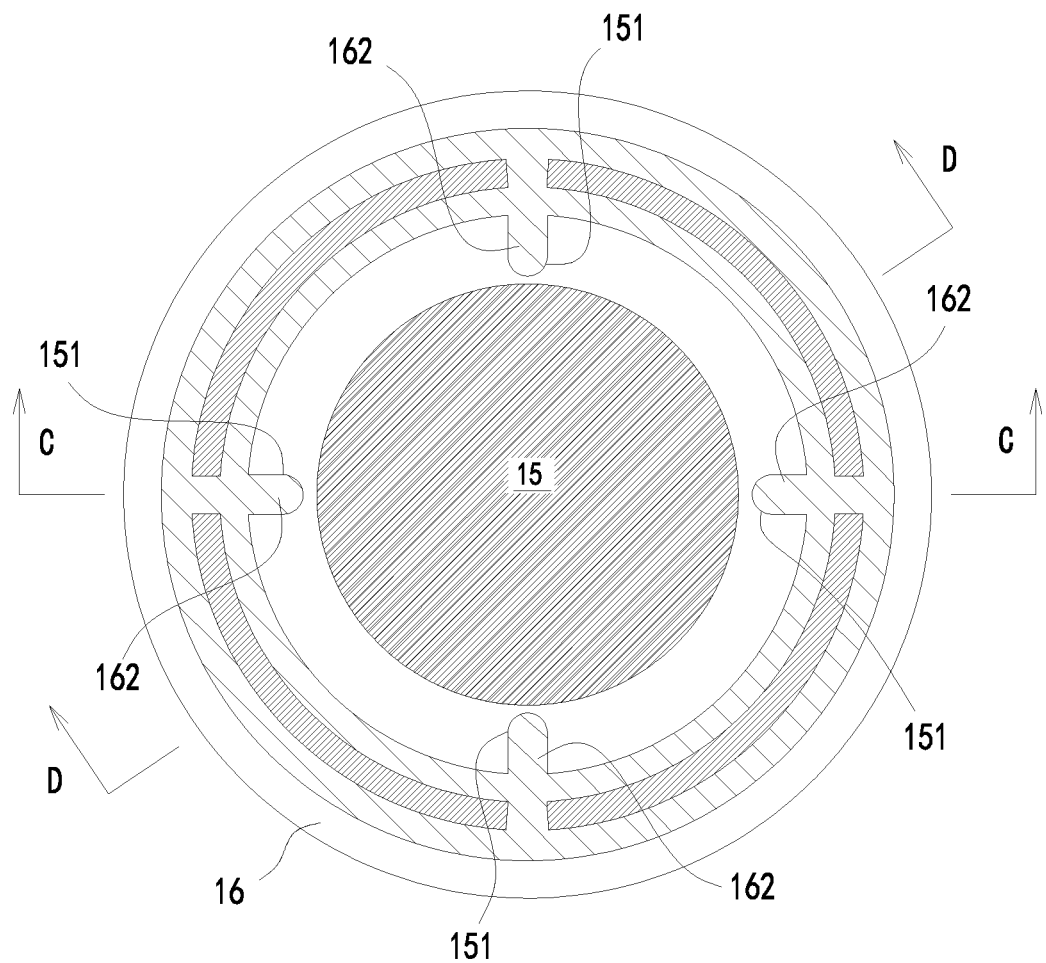
FIG. 8 is a structural section view of a connection of an electrode terminal and a fixing component according to an embodiment of the disclosure.
Figure 9:
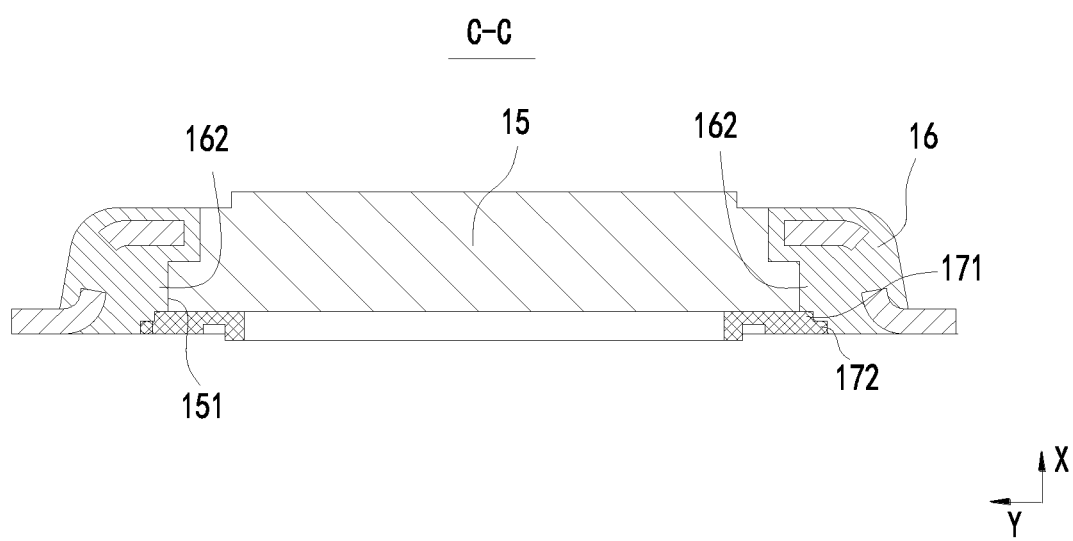
FIG. 9 is a sectional view along C-C in FIG. 8.
Figure 10:
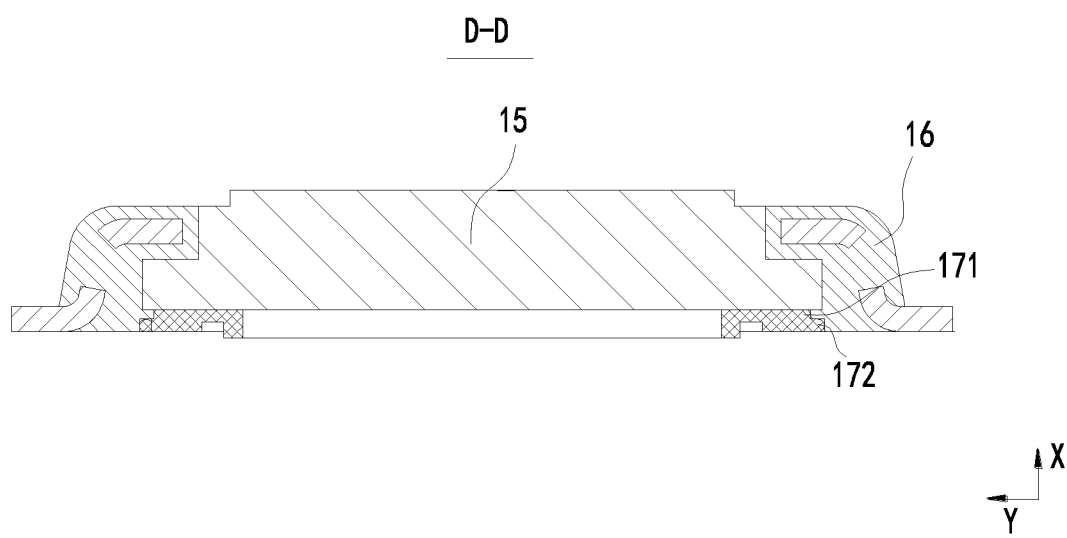
FIG. 10 is a sectional view along D-D in FIG. 8.

In an embodiment, referring to FIGS. 6-8, the sealing ring 17 includes a first segment 171 and a second segment 172 that are successively distributed along the axial direction X. The electrode terminal 15 includes a recess 151 at its periphery. The fixing component 16 includes a bump 162 disposed corresponding to the recess 151. When the bump 162 of the fixing component 16 is matched with and connected to the recess 151 of the electrode terminal 15, the electrode terminal 15 can be limited and thus prevented from rotating, and the positional stability of the electrode terminal 15 can be improved. Referring to FIGS. 9 and 10, in the radial direction Y of the electrode lead-out hole 141, the maximum outer diameter of the first segment 171 is smaller than the minimum outer diameter of the second segment 172, and the maximum outer diameter of the first segment 171 is larger than the minimum outer diameter of the electrode terminal 15 and is smaller than the maximum outer diameter of the electrode terminal 15. The maximum outer diameter and the minimum outer diameter described herein indicate that in the radial direction Y of the electrode lead-out hole 141, a longest straight line among all straight lines passing through the center of the sealing ring 17 or the center of the electrode terminal 15 corresponds to the maximum outer diameter, and a shortest straight line corresponds to the minimum outer diameter. Referring to FIG. 9, in the radial direction Y of the electrode lead-out hole 141, the periphery of the first segment 171 exceeds a bottom end 151a of the recess 151 but does not exceed the periphery of the entire electrode terminal 15. Accordingly, the first segment 171 of the sealing ring 17 does not affect the following case that the protrusion 161 of the fixing component 16 extends below the electrode terminal 15 in the radial direction Y to provide the bearing force for the electrode terminal 15. It is possible to ensure the positional stability of the electrode terminal 15 and to reduce the possibility that the electrode terminal 15 moves towards the cap plate due to the external force exerted on the electrode terminal 15.

In an embodiment, as seen in FIG. 4, there is a gap 99 between the periphery of the first segment 171 and the fixing component 16. When the electrode terminal 15 and the cap plate 14 jointly press the sealing ring 17, the first segment 171 is squeezed to expand in the radial direction Y. Due to the gap 99 between the expanded first segment 171 and the fixing component 16, the first segment 171 will not be restrained by the fixing component 16 which leads to warpage during the expansion, and there will be no large resilience force in the axial direction X accumulated in the first segment 171. In one example, the gap 99 is between the periphery of the first segment 171 and a surface of the protrusion 161 of the fixing component 16 facing the axis of the electrode extraction hole 141.

In an embodiment, referring to FIG. 4, there is a gap 99 between the periphery of the second segment 172 and the fixing component 16. When the electrode terminal 15, the protrusion 161 and the cap plate 14 jointly press the sealing ring 17, the second segment 172 is squeezed to expand in the radial direction Y. Due to the gap 99 between the expanded second segment 172 and the fixing component 16, the second segment 172 will not be restrained by the fixing component 16 which leads to warpage during the expansion, and there will be no large resilience force in the axial direction X accumulated in the second segment 172.

In an embodiment, each of the periphery of the first segment 171 and the periphery of the second segment 172 forms a gap 99 with the fixing component 16.

In an embodiment, as shown in FIG. 5, in the radial direction Y of the electrode lead-out hole 141, the second segment 172 extends beyond the first segment 171 by a dimension D1, and a maximum dimension of the first segment 171 is D2, wherein a ratio of D1/D2 is 0.01~0.1. The maximum dimension described herein indicates in the radial direction Y of the electrode lead-out hole 141, a longest straight line among all straight lines passing through the center of the sealing ring 17 corresponds to the maximum dimension. When the ratio of D1/D2 is smaller than 0.01, the dimension by which the second segment 172 extends beyond the first segment 171 is too small, so that the creepage distance between the electrode terminal 15 and the cap plate 14 along the periphery of the sealing ring 17 is too small, which improves the possibility that the direct electrical connection and breakdown occurs between the electrode terminal 15 and the cap plate 14. Optionally, the second segment 172 extends beyond the first segment 171 by a dimension D1 of 0.25 mm to 2 mm. Referring to FIG. 3, the fixing component 16 includes a metal support 16a and an insulator 16b covering the metal support 16a. The fixing component 16 is fixedly connected to the cap plate 14 through a portion of the metal support 16a exposed from the insulator 16b. Optionally, the metal support 16a is welded to the cap plate 14. When the ratio of D1/D2 is larger than 0.1, the second segment 172 needs to occupy more installation space, so that the thickness of the insulator 16b corresponding to the second segment 172 is too small, which lowers the insulation performance of the insulator 16b and improves the possibility that the breakdown between the metal support 16a and the cap plate 14 occurs in a region where the thickness of the insulator 16b is too small.

In an embodiment, referring to FIG. 5, in the axial direction X of the electrode lead-out hole 141, a height of the second segment 172 is H1, and a total height of the first segment 171 and the second segment 172 is H2, wherein a ratio of H1/H2 is 0.35~0.65. When the ratio of H1/H2 is smaller than 0.35, the height of the second segment 172 is too small, so that the portion of the second segment 172 beyond the first segment 171 becomes thinner and has a low rigidity, and thus is susceptible to structural damage when being subjected to a compressive stress. This in turn causes the unsuccessfully sealing of the sealing ring 17. Furthermore, there is a possibility that the breakdown between the electrode terminal 15 and the cap plate 14 occurs at the damage portion. When the ratio of H1/H2 is larger than 0.65, the portion of the second segment 172 that extends beyond the first segment 171 needs to occupy more space in the axial X direction, so that the protrusion 161 in the axial direction X has a small height and low rigidity. When the large force in the axial direction X is applied, the protrusion 161 is liable to be structurally damaged, and the supporting effect for the electrode terminal 15 is lost.

In an embodiment, the portion of the second segment 172 extending beyond the first segment 171 is disposed between the protrusion 161 and the cap plate 14 and has an amount of compression A in the axial direction X, while the first segment 171 and the second segment 172 of the sealing ring 17 have an overlapped portion 100 in the axial direction X (the overlapped portion 100 is illustrated schematically with a broken line in FIG. 4, but the broken line does not limit its structure). The overlapped portion 100 is disposed between the electrode terminal 15 and the cap plate 14 and has an amount of compression B in the axial direction X, wherein A is smaller than B. The amount of compression of the portion of the second segment 172 that extends beyond the first segment 171 refers to a ratio of a recovered height of the portion measured in the axial direction X when the portion returns to its free state from its compressed state, to a height of the portion measured in the axial direction X in the free state. The recovered height indicates a difference between the height of the portion measured in the axial direction X in the free state and the height measured in the axial direction X in the compressed state. The amount of compression of the overlapped portion 100 disposed between the electrode terminal 15 and the cap plate 14 refers to a ratio of a recovered height of the overlapped portion measured in the axial direction X when the portion returns from the compressed state to the free state, to a height of the overlapped portion 100 measured in the axial direction X in the free state. The recovered height indicates a difference between the height of the overlapped portion 100 measured in the axial direction X in the free state and the height of the overlapped portion 100 measured in the axial direction X in the compressed state. When the fixing component 16 is fixedly connected to the cap plate 14, since the amount of compression of the portion of the second segment 172 extending beyond the first segment 171 is smaller than the amount of compression of the overlapped portion 100 disposed between the electrode terminal 15 and the cap plate 14, the elastic restoring force of the portion of the second segment 172 extending beyond the first segment 171 in the axial direction X is smaller than the elastic restoring force of the overlapped portion 100 disposed between the electrode terminal 15 and the cap plate 14. Accordingly, it is secured that the electrode terminal 15, the cap plate 14, and the overlapped portion 100 disposed between the electrode terminal 15 and the cap plate 14 achieve good compression and sealing effect.

In an embodiment, in the radial direction Y of the electrode lead-out hole 141, the minimum outer diameter of the second segment 172 is larger than the maximum outer diameter of the electrode terminal 15. The maximum outer diameter and the minimum outer diameter described herein indicate in the radial direction Y of the electrode lead-out hole 141, a longest straight line among all straight lines passing through the center of the sealing ring 17 or the center of the electrode terminal 15 corresponds to the maximum outer diameter, and a shortest straight line corresponds to the minimum outer diameter. The second segment 172 extends beyond the periphery of the electrode terminal 15, thus the creepage distance between the electrode terminal 15 and the cap plate 14 can be further increased.

In an embodiment, referring to FIG. 5, an angle α between an outline of the periphery of the first segment 171 in the longitudinal sectional view and an outline of a surface of the second segment 172 facing the protrusion 161 in the longitudinal sectional view has a range of 90° to 120°. When the angle α is smaller than 90° or the angle α is larger than 120°, the periphery of the first segment 171 and/or the surface of the second segment 172 facing the protrusion 161 will be inclined. It is disadvantageous to the smooth assembling of the electrode terminal 15, the protrusion 161 and the sealing ring 17, and the assembly of the electrode terminal 15, the protrusion 161, and the sealing ring 17 will have a poor compactness. Furthermore, when the angle α is larger than 120° and the periphery of the first segment 171 is inclined, the contact sealing area of the electrode terminal 15 and a surface of the first segment 171 facing the electrode terminal 15 is relatively reduced, resulting in a decrease in sealing effect.

In an embodiment, referring to FIG. 4, the cap assembly 13 further includes a lower insulator 18. The lower insulator 18 includes a body portion and a first extending portion 181. The body portion and the fixing component 16 are respectively disposed at opposite sides of the cap plate 14. The first extending portion 181 extends at least partially into the electrode lead-out hole 141. The sealing ring 17 includes a second extending portion 173. The second extending portion 173 at least partially extends into the electrode lead-out hole 141. In the axial direction X of the electrode lead-out hole 141, a height of the second extending portion 173 is larger than a height of the first extending portion 181. In one example, the first extending portion 181 and the second extending portion 173 are connected. Since the height of the second extending portion 173 is larger than the height of the first extending portion 181, the creepage distance between the electrode terminal 15 and the cap plate 14 is increased, and the possibility that the breakdown between the electrode terminal 15 and the cap plate 14 occurs is reduced.

In an embodiment, the sealing ring 17 includes an annular groove 174 in its surface facing the cap plate 14. The cap plate 14 includes an annular bulge 142 that protrudes toward the electrode terminal 15. The annular groove 174 and the annular bulge 142 have matched shapes. The annular bulge 142 extends at least partially into the annular groove 174 and is connected to the sealing ring 17 to further improve the sealing effect between the sealing ring 17 and the cap plate 14.

In an embodiment, the electrode terminal 15 is a negative terminal.

In another aspect, referring to FIG. 1, an embodiment of the disclosure provides a secondary battery 10 including a case 11, an electrode assembly 12 disposed in the case 11, and a cap assembly 13 connected to the case 11. The case 11 has a cylindrical shape including an opening. The electrode assembly 12 is housed in the case 11. The electrode assembly 12 includes a body and a tab extending from the body. The cap assembly 13 is connected to the case 11 and seals the opening of the case 11. The tab of the electrode assembly 12 is electrically connected to the electrode terminal 15.

In an embodiment, the secondary battery 10 further includes a collector 19. The tab is connected to the electrode terminal 15 through the collector 19.

The secondary battery 10 according to embodiments of the disclosure includes a case 11, an electrode assembly 12, and a cap assembly 13 according to the above embodiments. Since the cap plate 14 and the electrode terminal 15 are connected through the sealing ring 17, it reduces the possibility that metal debris enters the gap between the cap plate 14 and the electrode terminal 15, which may cause a short circuit between the cap plate 14 and the electrode terminal 15 due to the metal debris, and improves the safety of the secondary battery 10 in use. The sealing ring 17 can increase the creepage distance between the electrode terminal 15 and the cap plate 14, and reduce the possibility that the breakdown between the electrode terminal 15 and the cap plate 14 occurs. Furthermore, when the electrolyte leaks, the sealing ring 17 can reduce the excessive electrolyte accumulated between the electrode terminal 15 and the cap plate 14, which then causes a reduced resistance between the electrode terminal 15 and the cap plate 14. Accordingly, it reduces the possibility that the breakdown between the electrode terminal 15 and the cap plate 14 occurs when the secondary battery is subjected to high pressure, and improves the safety of the cap assembly 13 in use.

Although the disclosure has been described with reference to the preferred embodiments, various modifications may be made to the disclosure and components may be replaced with equivalents without departing from the scope of the disclosure. In particular, the technical features mentioned in the various embodiments can be combined in any manner as long as there is no structural conflict. The disclosure is not limited to the specific embodiments disclosed herein, but comprises all technical solutions falling within the scope of the claims.

What is claimed is:

1. A cap assembly for a secondary battery, comprising:
a cap plate comprising an electrode lead-out hole;
an electrode terminal disposed at a side of the cap plate and covering the electrode lead-out hole;
a fixing component, wherein the fixing component and the electrode terminal are disposed at the same side of the cap plate, the electrode terminal is connected to the cap plate through the fixing component, and the fixing component comprises a protrusion extending between the electrode terminal and the cap plate in an axial direction of the electrode lead-out hole; and
a sealing ring, wherein the cap plate is connected to the electrode terminal through the sealing ring, and in the axial direction of the electrode lead-out hole, a projection of the sealing ring at least partially overlaps with a projection of the protrusion,
a portion of the sealing ring is configured to be disposed between the electrode terminal and the cap plate, and is configured to be directly connected to both the electrode terminal and the cap plate.

2. The cap assembly according to claim 1, wherein in the axial direction, a portion of the sealing ring that overlaps with the protrusion is in contact with the protrusion, and the portion of the sealing ring that overlaps with the protrusion is in contact with the cap plate.

3. The cap assembly according to claim 1, wherein an annular cavity is formed between the protrusion and the cap plate, wherein the annular cavity has an opening facing an axis of the electrode lead-out hole, and the sealing ring is at least partially disposed in the annular cavity.

4. The cap assembly according to claim 1, wherein the sealing ring comprises a first segment and a second segment that are successively distributed along the axial direction, wherein in a radial direction of the electrode lead-out hole, a maximum outer diameter of the first segment is smaller than a minimum outer diameter of the second segment, and the maximum outer diameter of the first segment is smaller than a minimum outer diameter of a segment of the electrode terminal in direct contact with the sealing ring.

5. The cap assembly according to claim 1, wherein the sealing ring comprises a first segment and a second segment that are successively distributed along the axial direction, wherein the electrode terminal comprises a recess at its periphery, and the fixing component comprises a bump disposed corresponding to the recess, and wherein in a radial direction of the electrode lead-out hole, a maximum outer diameter of the first segment is smaller than a minimum outer diameter of the second segment, and the maximum outer diameter of the first segment is larger than a minimum outer diameter of the electrode terminal and is smaller than a maximum outer diameter of the electrode terminal.

6. The cap assembly according to claim 4, wherein there is a gap between a periphery of the first segment and the fixing component and/or there is a gap between a periphery of the second segment and the fixing component.

7. The cap assembly according to claim 4, wherein in the radial direction of the electrode lead-out hole, the second segment extends beyond the first segment by a dimension D1, and a maximum dimension of the first segment is D2, wherein a ratio of D1/D2 is 0.01~0.1.

8. The cap assembly according to claim 4, wherein in the axial direction of the electrode lead-out hole, a height of the second segment is H1, and a total height of the first segment and the second segment is H2, wherein a ratio of H1/H2 is 0.35~0.65.

9. The cap assembly according to claim 4, wherein a portion of the second segment extending beyond the first segment is disposed between the protrusion and the cap plate and has an amount of compression A in the axial direction; and the first segment and the second segment of the sealing ring have an overlapped portion in the axial direction, and the overlapped portion is disposed between the electrode terminal and the cap plate and has an amount of compression B in the axial direction, wherein A is smaller than B.

10. The cap assembly according to claim 4, wherein in the radial direction of the electrode lead-out hole, the minimum outer diameter of the second segment is larger than the maximum outer diameter of the electrode terminal.

11. The cap assembly according to claim 4, wherein an angle between an outline of a periphery of the first segment in a longitudinal sectional view and an outline of a surface of the second segment facing the protrusion in the longitudinal sectional view has a range of 90° to 120°.

12. The cap assembly according to claim 1, wherein the cap assembly further comprises a lower insulator which comprises a body portion and a first extending portion, wherein the body portion and the fixing component are respectively disposed at opposite sides of the cap plate, and the first extending portion extends at least partially into the electrode lead-out hole; the sealing ring comprises a second extending portion which at least partially extends into the electrode lead-out hole; and in the axial direction, a height of the second extending portion is larger than a height of the first extending portion.

13. The cap assembly according to claim 1, wherein the cap plate has a thickness of 0.01 cm to 10 cm in the axial direction, and/or the electrode terminal has a thickness of 0.01 cm to 10 cm in the axial direction.

14. The cap assembly according to claim 5, wherein there is a gap between a periphery of the first segment and the fixing component and/or there is a gap between a periphery of the second segment and the fixing component.

15. The cap assembly according to claim 5, wherein in the radial direction of the electrode lead-out hole, the second segment extends beyond the first segment by a dimension D1, and a maximum dimension of the first segment is D2, wherein a ratio of D1/D2 is 0.01~0.1.

16. The cap assembly according to claim 5, wherein in the axial direction of the electrode lead-out hole, a height of the second segment is H1, and a total height of the first segment and the second segment is H2, wherein a ratio of H1/H2 is 0.35~0.65.

17. The cap assembly according to claim 5, wherein a portion of the second segment extending beyond the first segment is disposed between the protrusion and the cap plate and has an amount of compression A in the axial direction; and the first segment and the second segment of the sealing ring have an overlapped portion in the axial direction, and the overlapped portion is disposed between the electrode terminal and the cap plate and has an amount of compression B in the axial direction, wherein A is smaller than B.

18. The cap assembly according to claim 5, wherein in the radial direction of the electrode lead-out hole, the minimum outer diameter of the second segment is larger than the maximum outer diameter of the electrode terminal.

19. The cap assembly according to claim 5, wherein an angle between an outline of a periphery of the first segment in a longitudinal sectional view and an outline of a surface of the second segment facing the protrusion in the longitudinal sectional view has a range of 90° to 120°.

20. A secondary battery, comprising:
a case comprising an opening;
an electrode assembly disposed in the case, wherein the electrode assembly comprises a body and a tab extending from the body; and
a cap assembly for sealing the opening, comprising:
a cap plate comprising an electrode lead-out hole;
an electrode terminal disposed at a side of the cap plate and covering the electrode lead-out hole;
a fixing component, wherein the fixing component and the electrode terminal are disposed at the same side of the cap plate, the electrode terminal is connected to the cap plate through the fixing component, and the fixing component comprises a protrusion extending between the electrode terminal and the cap plate in an axial direction of the electrode lead-out hole; and
a sealing ring, wherein the cap plate is connected to the electrode terminal through the sealing ring, and in the axial direction of the electrode lead-out hole, a projection of the sealing ring at least partially overlaps with a projection of the protrusion, a portion of the sealing ring is configured to be disposed between the electrode terminal and the cap plate, and is configured to be directly connected to both the electrode terminal and the cap plate,
wherein the tab is electrically connected to the electrode terminal.

\* \* \* \* \*